United States Patent
Mo et al.

(10) Patent No.: US 9,722,745 B2
(45) Date of Patent: Aug. 1, 2017

(54) METHOD AND BASE STATION FOR COORDINATED MULTI POINT DATA TRANSMISSION

(71) Applicant: ZTE CORPORATION, Shenzhen, Guangdong Province (CN)

(72) Inventors: Linmei Mo, Shenzhen (CN); Yajun Zhao, Shenzhen (CN); Baoyu Sun, Shenzhen (CN); Chen Huang, Shenzhen (CN); Hanqing Xu, Shenzhen (CN); Yujie Li, Shenzhen (CN); Hongfeng Qin, Shenzhen (CN); Guofeng Chen, Shenzhen (CN); Hongfeng Yuan, Shenzhen (CN); Xin Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 8 days.

(21) Appl. No.: 14/655,730

(22) PCT Filed: Aug. 14, 2013

(86) PCT No.: PCT/CN2013/081453
§ 371 (c)(1),
(2) Date: Jul. 24, 2015

(87) PCT Pub. No.: WO2013/185732
PCT Pub. Date: Dec. 19, 2013

(65) Prior Publication Data
US 2015/0381328 A1      Dec. 31, 2015

(30) Foreign Application Priority Data

Dec. 27, 2012    (CN) .......................... 2012 1 0576526

(51) Int. Cl.
*H04L 5/00*      (2006.01)
*H04B 7/024*    (2017.01)
(Continued)

(52) U.S. Cl.
CPC ......... *H04L 5/0035* (2013.01); *H04B 1/0475* (2013.01); *H04B 7/024* (2013.01);
(Continued)

(58) Field of Classification Search
None
See application file for complete search history.

(56) References Cited

U.S. PATENT DOCUMENTS

| 2011/0210892 A1* | 9/2011 | Shany | H01Q 3/26 342/373 |
| 2012/0207054 A1* | 8/2012 | Okubo | H04L 1/0003 370/252 |
| 2013/0257655 A1* | 10/2013 | Hu | H04B 7/0408 342/373 |

FOREIGN PATENT DOCUMENTS

| CN | 102036393 A | 4/2011 |
| CN | 102130758 A | 7/2011 |

(Continued)

OTHER PUBLICATIONS

CSI Feedback Scheme for JT CoMP; NTT Docomo; 3GPP TSG WG1 Meeting #66bis; Zhuhai, China, Oct. 10-14, 2011. R1-113292.
(Continued)

*Primary Examiner* — Christopher Crutchfield
*Assistant Examiner* — Tito Pham
(74) *Attorney, Agent, or Firm* — Ling Wu; Stephen Yang; Ling and Yang Intellectual Property

(57) ABSTRACT

A method and base station for coordinated multi point data transmission are disclosed. The method includes: a base station receiving a per-cell CQI value reported by a UE;
(Continued)

looking up an SINR-CQI mapping table according to the per-cell CQI value, and acquiring a subband/broadband SINR value; performing CQI recalculation according to the subband/broadband SINR value, and acquiring a recalculated subband/broadband CQI value; and selecting modulation and coding according to the recalculated subband/broadband CQI value to schedule data transmission. With the method and base station of the embodiments of the present document, in a CoMP system, in a joint transmission scenario, the accuracy of the CQI value used by the BS for scheduling is improved, and the oscillation during an AMC process is reduced.

10 Claims, 3 Drawing Sheets

(51) Int. Cl.
*H04B 1/04* (2006.01)
*H04B 7/04* (2017.01)
*H04B 7/06* (2006.01)
*H04B 7/08* (2006.01)
*H04W 72/08* (2009.01)
*H04L 1/00* (2006.01)
*H04W 88/08* (2009.01)

(52) U.S. Cl.
CPC .......... *H04B 7/043* (2013.01); *H04B 7/0632* (2013.01); *H04B 7/0857* (2013.01); *H04L 1/0009* (2013.01); *H04L 1/0026* (2013.01); *H04L 1/0077* (2013.01); *H04W 72/082* (2013.01); *H04L 1/0003* (2013.01); *H04L 5/006* (2013.01); *H04L 5/0048* (2013.01); *H04W 88/08* (2013.01)

(56) References Cited

FOREIGN PATENT DOCUMENTS

| | | |
|---|---|---|
| CN | 102291740 A | 12/2011 |
| CN | 102404028 A | 4/2012 |
| CN | 102457359 A | 5/2012 |

OTHER PUBLICATIONS

CQI computation for CoMp; 3GPP TSG RAN WG1 Meeting #67; San Francisco, USA, Nov. 14-18, 2011; R1-113766.
CoMP CQI for TDD; ZTE; 3GPP TSG RAN WG1 Meeting #69; Prague, Czech Republic, May 21-25, 2012. R1-122133.
CQI feedback to support downlink CoMP; Media Tek Inc. 3GPP TSG RAN WG1 Meeting #69; Prague, Czech Republic, May 21-25, 2012. R1-122158.

* cited by examiner

METHOD AND BASE STATION FOR COORDINATED MULTI POINT DATA TRANSMISSION

TECHNICAL FIELD

The present document relates to the field of communication technology, and particularly, to a method and a base station for Coordinated Multi Point (CoMP) data transmission.

BACKGROUND OF THE RELATED ART

The coordinated multi point technology can be used for enlarging a cell coverage area of the high data rate and improving throughput of the cell-edge user, thereby improving the system throughput. At present, this technology has been used in a Long Term Evolution-Advanced (LTE-Advanced) system so as to improve the overall system performance.

A basic concept of the CoMP is multiple transmission points at different geographical locations coordinating to serve one or more than one user. The CoMP downlink transmission technology can be divided into two cases: Coordinated Scheduling (CS) and Joint Transmission (JT). Wherein, the coordinated scheduling refers to multiple transmission points within a coordinated set participating in the coordinated scheduling, a scheduling result is only one transmission point sending downlink data of the User Equipment (UE) on the same time-frequency resource; and the joint transmission refers to multiple points performing coordination to transmit downlink data of one UE simultaneously.

In the LTE system, the UE calculates a Channel Quality Indicator (CQI) based on a certain time domain observed result and frequency domain observed result, and feed back the CQI to a Base Station (BS) through an uplink subframe, and the BS uses a corresponding modulation and coding scheme according to a CQI value fed back by the UE. Generally, a range of the CQI value is 0~15, each of CQI values 1~15 corresponds to one modulation and coding scheme, in a channel condition responded by a reference signal corresponding to the CQI measurement, the corresponding modulation and coding scheme is adopted to perform Physical Downlink Shared Channel (PDSCH) transmission, and a received block error rate should not exceed 0.1. When this condition cannot be satisfied, a CQI value is 0. The CQI values from low to high respectively represent modulation and coding rates of the data from low to high namely transmission efficiencies of the data from low to high. Therefore, if a CQI value is higher, it indicates that a channel transmission condition is better, and data with a higher modulation and coding rate can be transmitted.

In the Rel-8/Rel-9 LTE system, only one BS serves one UE, thus all signals of other BSs are interference signals to the UE. The UE performs Per-Cell CQI calculation and feedback according to this assumption. After the CoMP mechanism is introduced, multiple BSs simultaneously send data of one UE, if the UE still performs CQI calculation according to the Rel-8/Rel-9 way, generally effective signals from a coordinated cell will be taken as interference signals to be processed, a lower CQI calculated value is caused, and the BS can only adopt a more conservative modulation and coding scheme. Even though the modulation and coding scheme also can be adjusted through Open-Loop Link Adaption (OLLA) in the LTE, the workload of the OLLA will be certainly increased, and the oscillation during an Adaptive Modulation and Coding (AMC) process will be aggravated.

SUMMARY

The embodiments of the present document provide a method and a base station (BS) for coordinated multi point data transmission, to improve the accuracy of the CQI used by the BS for scheduling, and to reduce the oscillation during an Adaptive Modulation and Coding (AMC) process in the coordinated multi point transmission.

The embodiment of the present document provides a method for coordinated multi point data transmission, which comprises:

a base station receiving a per-cell channel quality indicator (CQI) value reported by a user equipment (UE);

looking up a signal to interference plus noise ratio (SINR)-CQI mapping table according to the per-cell CQI value, and acquiring a subband/broadband SINR value;

performing CQI recalculation according to the subband/broadband SINR value, and acquiring a recalculated subband/broadband CQI value; and selecting modulation and coding according to the recalculated subband/broadband CQI value to schedule data transmission.

Alternatively, the step of the base station performing CQI recalculation according to the subband/broadband SINR value, and acquiring a recalculated subband/broadband CQI value comprises:

the base station performing uplink channel estimation through a sounding reference signal (SRS), acquiring SRS channel values of a serving cell and a coordinated cell; and calculating beamforming vectors of the serving cell and the coordinated cell through the SRS channel values;

recalculating a joint transmission (JT) interference noise according to the SRS channel values and the subband/broadband SINR value;

calculating an equivalent downlink channel value based on the SRS channel values and the beamforming vectors;

recalculating the subband/broadband SINR value according to the equivalent downlink channel value and the recalculated JT interference noise; and looking up the SINR-CQI mapping table according to the recalculated subband/broadband SINR value, and acquiring the recalculated subband/broadband CQI value.

Alternatively, a way for calculating the beamforming vectors at least comprises: an Eigen-based beamforming (EBB) algorithm or a singular-value decomposition (SVD) algorithm.

Alternatively, after the step of the base station acquiring SRS channel values of a serving cell and a coordinated cell; and calculating beamforming vectors of the serving cell and the coordinated cell through the SRS channel values, the method further comprises:

the base station performing subband/broadband averaging on the SRS channel values and the beamforming vectors.

Alternatively, the step of the base station recalculating a JT interference noise according to the SRS channel values and the subband/broadband SINR value comprises:

the base station restoring base station transmitting port signal power and a coordinated cell interference signal according to the SRS channel values; and recalculating the JT interference noise according to the restored base station transmitting port signal power and coordinated cell interference signal and the subband/broadband SINR value.

The embodiment of the present document further provides a base station for coordinated multi point data transmission, which comprises:

a receiving module, configured to: receive a per-cell channel quality indicator (CQI) value reported by a user equipment (UE);

a lookup module, configured to: look up a signal to interference plus noise ratio (SINR)-CQI mapping table according to the per-cell CQI value and acquire a subband/broadband SINR value;

a recalculation module, configured to: performing CQI recalculation according to the subband/broadband SINR value, and acquire a recalculated subband/broadband CQI value; and a scheduling module, configured to: select modulation and coding according to the recalculated subband/broadband CQI value to schedule data transmission.

Alternatively, the recalculation module comprises:

an SRS channel value acquisition unit, configured to: perform uplink channel estimation through a sounding reference signal (SRS), and acquire SRS channel values of a serving cell and a coordinated cell;

a beamforming vector calculation unit, configured to: calculate beamforming vectors of the serving cell and the coordinated cell through the SRS channel values;

an interference noise recalculation unit, configured to: recalculate a joint transmission (JT) interference noise according to the SRS channel values and the subband/broadband SINR value;

an equivalent channel calculation unit, configured to: calculate an equivalent downlink channel value based on the SRS channel values and the beamforming vectors;

a recalculation unit, configured to: recalculate the subband/broadband SINR value according to the equivalent downlink channel value and the recalculated JT interference noise; and a recalculated CQI acquisition unit, configured to: look up the SINR-CQI mapping table according to the recalculated subband/broadband SINR value, and acquire the recalculated subband/broadband CQI value.

Alternatively, a way for calculating the beamforming vectors at least comprises: an Eigen-based beamforming (EBB) algorithm or a singular-value decomposition (SVD) algorithm.

Alternatively, the recalculation module further comprises:

an averaging unit, configured to: perform subband/broadband averaging on the SRS channel values and the beamforming vectors.

Alternatively, the interference noise recalculation unit is configured to: restore base station transmitting port signal power and a coordinated cell interference signal according to the SRS channel values; and recalculate the JT interference noise according to the restored base station transmitting port signal power and coordinated cell interference signal and the subband/broadband SINR value.

With the method and base station for coordinated multi point data transmission provided in the embodiments of the present document, in the CoMP system, and in a joint transmission scenario, the BS performs JT CQI recalculation according to the per-cell CQI value fed back by the UE, and acquires the recalculated subband/broadband CQI value; and selects modulation and coding according to the recalculated subband/broadband CQI value to schedule data transmission, thereby improving the accuracy of the CQI value used by the BS for scheduling, and reducing the oscillation during the AMC process.

PREFERRED EMBODIMENTS OF THE INVENTION

The embodiments of the present document will be described in detail in combination with the accompanying drawings below. It should be noted that the embodiments in the present document and the characteristics in the embodiments can be optionally combined with each other in the condition of no conflict.

In the embodiments of the present document, in the CoMP system, and in a joint transmission scenario, the BS performs JT CQI recalculation according to the per-cell CQI value fed back by the UE, and acquires the recalculated subband/broadband CQI value; and selects modulation and coding according to the recalculated subband/broadband CQI value to schedule data transmission, so as to improve the accuracy of the CQI value used by the BS for scheduling, and reduce the oscillation during the AMC process.

In view of that a scheme usually adopted for accurately acquiring the CQI value at present is: when the UE calculates the CQI, directly calculating an aggregated CQI according to a CoMP transmission hypothesis, and reporting the aggregated CQI and the original per-cell CQI to the BS together, this scheme will increase the calculation quantity and feedback quantity of the UE.

Therefore, the following scheme is used in the embodiments of the present document: the UE performs feedback of per-cell CQI according to an original protocol, the BS performs CQI recalculation, and performs data transmission according to the recalculated CQI, so as to improve the accuracy of the CQI used by the BS for scheduling, and to reduce the oscillation during an AMC process.

Figure 1:
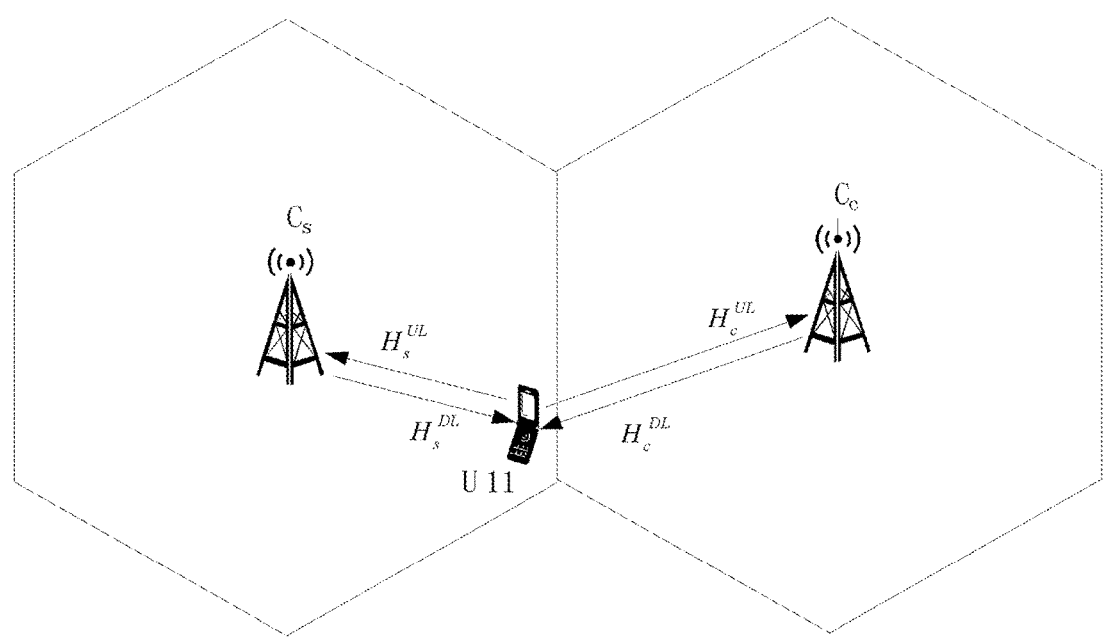
FIG. 1 is a schematic diagram of two cells performing CoMP joint transmission in the embodiment of the present document.

FIG. 1 is a schematic diagram of two cells performing CoMP joint transmission in the embodiment of the present document, in the CoMP system as shown in FIG. 1, a user equipment $U_{11}$ is in a CoMP mode; a $C_s$ is a serving cell of the $U_{11}$; $C_c$ is another coordinated cell within a CoMP coordinated set. It is assumed that the $U_{11}$ is in a joint transmission mode, the serving cell and coordinated cell will simultaneously send useful signals to the $U_{11}$.

The user equipment $U_{11}$ feeds back a traditional per-cell CQI to the serving cell $C_s$, the CQI is calculated based on a per-cell Space-Frequency Block Coding (SFBC) transmission hypothesis. According to the CQI value reported by the UE, channel estimation results of Sounding Reference Signals (SRS) of the current cell and neighboring cell, and Beamforming (BF) weighted vectors, the serving cell performs JT CQI recalculation based on a multi-cell joint transmission hypothesis, and selects an appropriate modulation and coding scheme according to the recalculated CQI to perform data transmission.

Figure 2:
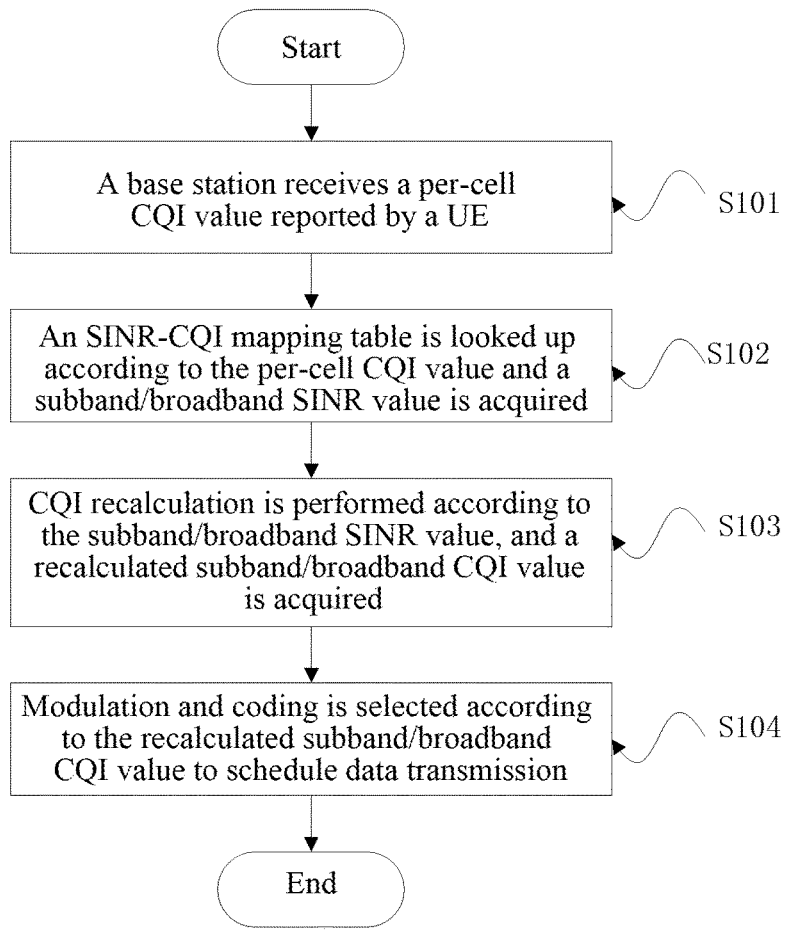
FIG. 2 is a schematic diagram of a flow of a method for coordinated multi point data transmission in the embodiment of the present document.

As shown in FIG. 2, a method for coordinated multi point data transmission provided in one embodiment of the present document includes the following steps.

In step S101, a base station receives a per-cell CQI value reported by a UE.

Firstly, the UE performs downlink channel estimation by using Cell-specific Reference Signals (CRS), and performs Signal to Interference plus Noise Ratio (SINR) calculation.

In the Rel-8/Rel-9 LTE system, the UE assumes that only the serving cell uses an SFBC mode to perform transmission, and performs downlink channel estimation according to the CRS, and it can perform SINR calculation by using a downlink CRS channel estimation result. For example, the SINR calculation can be calculated according to the following formula (1):

$$SINR_s = \frac{0.5 * |H_s^{DL}|^2}{P_{ICI}^c + P_{ICI}^{out} + P_N} \quad (1)$$

wherein, $H_s^{DL}$ indicates a downlink channel obtained by estimation through the CRS, $P_{ICI}^c$ indicates interference power of cells within the coordinated set, $P_{ICI}^{out}$ indicates interference power of other cells except the serving cell and coordinated cell, and $P_N$ indicates noise power.

As can be seen from the above formula (1) that, the interference noise estimated by the UE side through the CRS simultaneously contains three items: $P_{ICI}^c$, $P_{ICI}^{out}$ and $P_N$. In fact, with regard to the JT UE, the first item is actually a useful signal, only the second item and the third item are actual interference and noise, a sum of out-set interference noise power is indicated by $\sigma^2 \triangleq P_{ICI}^{out}+P_N$, and the recalculation of the out-set interference noise power will be performed at the BS side in the following steps.

The UE uses the calculated SINR value to look up an SINR-CQI mapping table and obtains a per-cell CQI value, and feeds back the per-cell CQI value to the serving cell.

Different SINR values reflect different channel conditions, if an SINR value is lower, it indicates that a channel condition is worse, and a modulation and coding level that can be scheduled by the base station is lower; and if the SINR value is higher, it indicates that the channel condition is better, and the modulation and coding level that can be scheduled by the base station is higher.

Wherein, the SINR-CQI mapping table is to divide an SINR value range from low to high into 16 areas to be respectively mapped to CQI values 0~15 according to results of repeated performance simulations and certain empirical laws, as shown in the following Table 1.

TABLE 1

| SINR Range | CQI Value |
| --- | --- |
| [TH15, Th16) | 15 |
| [TH14, Th15) | 14 |
| [TH13, Th14) | 13 |
| [TH12, Th13) | 12 |
| [TH11, Th12) | 11 |
| [TH10, Th11) | 10 |
| [TH9, Th10) | 9 |
| [TH8, Th9) | 8 |
| [TH7, Th8) | 7 |
| [TH6, Th7) | 6 |
| [TH5, Th6) | 5 |

TABLE 1-continued

| SINR Range | CQI Value |
| --- | --- |
| [TH4, Th5) | 4 |
| [TH3, Th4) | 3 |
| [TH2, Th3) | 2 |
| [TH1, Th2) | 1 |
| [TH0, Th1) | 0 |

The CQI feedback can be subband feedback or broadband feedback, the subband feedback refers to feeding back a CQI value on each scheduled subband, and the broadband feedback refers to feeding back a CQI value on the whole bandwidth.

In step S102, an SINR-CQI mapping table is looked up according to the per-cell CQI value, and a subband/broadband SINR value is acquired.

The base station reversely looks up the SINR-CQI mapping table through the subband and/or broadband CQI value reported by the UE and obtains the subband/broadband SINR value.

After the serving cell receives the CQI value reported by the UE, the SINR-CQI mapping table is reversely looked up through the CQI value to obtain the SINR value, the look-up method can be taking a lower bound or upper bound of an SINR area corresponding to the CQI or a mean value of two adjacent thresholds.

For example, $SINR_{cur}$ an SINR value corresponding to the CQI and $SINR_{next}$ is an SINR value corresponding to the CQI+1, thus a reversely look-up SINR can be the $SINR_{cur}$, $SINR_{next}$ or $0.5\times(SINR_{cur}+SINR_{next})$.

In step S103, CQI recalculation is performed according to the subband/broadband SINR value, and a recalculated subband/broadband CQI value is acquired.

Firstly, the serving cell and the coordinated cell respectively perform uplink channel estimation through the SRS, and perform beamforming vector calculation according to this.

The serving cell and the coordinated cell respectively perform uplink channel estimation by using the received SRS value, obtain a serving cell uplink channel $H_s^{UL}$ and a coordinated cell uplink channel $H_c^{UL}$, and perform beamforming vector calculation by using channel estimation results, and a calculation method thereof can be the following two kinds:

(1) Eigen-based Beamforming (EBB) algorithm;
(2) Singular-value decomposition (SVD) algorithm.

The beamforming vectors of the serving cell and coordinated cell are respectively recorded as $W_s$ and $W_c$.

Moreover, in order to improve the accuracy of the following calculation, the serving cell and coordinated cell also can perform subband/broadband averaging on the SRS channel values and the beamforming vectors.

Secondly, the JT interference noise is recalculated according to the SRS channel values of the serving cell and coordinated cell and the SINR value.

For example, the JT interference noise can be recalculated according to the following method according to the above formula (1):

$$\sigma^2 \overset{def}{=} P_{ICI}^{out} + P_N = \frac{0.5 * |H_s^{DL}|^2}{SINR_s} - P_{ICI}^c; \quad (2)$$

Since uplink and downlink channels of a Time Division Duplexing (TDD) system have reciprocity, the BS can take an uplink channel obtained by estimation through the SRS as a similarity to a downlink channel.

By taking two coordinated cells as an example, the base station uses 4-transmitting-antennas (2-transmitting-ports) configuration, and the UE uses 2-receiving-antennas configuration. At the UE side, downlink channels $H_s^{DL}$ and $H_c^{DL}$ are obtained by estimation according to the CRS, and a dimensionality is 2×2. At the base station side, uplink channels $H_s^{UL}$ and $H_c^{UL}$ are obtained by estimation according to the SRS, and a dimensionality is 4×2.

At the transmitting end, data of two ports of the CRS are mapped via the antennas and multiplied by a broadcasting weight to be transmitted. The first transmitting port mapping to the first antenna and the second antenna, the second transmitting port mapping to the third antenna and the fourth antenna, and power of all antennas being equally divided are taken as an example. It can be represented by a matrix $$W_{BC} = \begin{bmatrix} 0.5 & \\ 0.5 & \\ & 0.5 \\ & 0.5 \end{bmatrix}.$$

Obviously, according to the channel reciprocity, $H_s^{DL} \leftrightarrow (H_s^{UL})^T * W_{BC}$, $H_c^{DL} \leftrightarrow (H_c^{UL})^T * W_{BC}$, wherein, $\leftrightarrow$ represents being equivalent to.

In addition, without loss of generality, it is assumed that a scheme similar to CRS shift is adopted in the JT coordinated cell, that is, CRSs of the serving cell and coordinated cell are transmitted on the same Resource Element (RE). Therefore, coordinated cell interference measured on the CRS of the serving cell is from the CRS of the coordinated cell. Since transmitting ports of the CRS of the coordinated cell are mutually staggered, the number of transmitting ports is recorded as $N_{TxPort}$, and power on each port is $1/N_{TxPort}$ of total transmitted power of the CRS. A sum of transmitted power of all ports of the CRS is 1. At the base station side, a two-antennas alternating transmission scheme is used for the SRS, transmitted power of each antenna is 1, thus SRS channel power is two times of CRS channel power.

The basic steps of the interference noise recalculation in the embodiment include: firstly restoring signal power and coordinated cell signal power mistakenly taken as "interference", subtracting the coordinated cell signal power from the interference noise power restored by using the per-cell CQI, and obtaining the JT interference noise power.

For example, the interference noise recalculation can be performed according to the following steps.

In step 1, the signal power is restored:

$$SigPwr = 0.5 * |(H_s^{UL})^T * W_{BC}|^2 \quad (3).$$

In step 2, the coordinated cell interference is restored:

$$P_{ICI}^c = |(H_c^{UL})^T * W_{BC}|^2 (2 * N_{TxPort}) \quad (4).$$

With regard to a scenario of multiple coordinated cells, it is only required to add signal energy of the multiple coordinated cells, that is, $$P_{ICI}^c = P_{ICI_1}^c + P_{ICI_2}^c + \ldots + P_{ICI_N}^c;$$

and with regard to a scenario that a single cell has precoding CQI recalculation, $P_{ICI}^c = 0$.

In step 3, the JT interference noise power is recalculated:

$$\sigma^2 = \frac{SigPwr}{SINR} - P_{ICI}^c. \quad (5)$$

When subband CQI calculation is performed, interference noise recalculation is independently performed on each subband, certain smoothing can be performed between subbands, for example, calculation is performed according to $\sigma(n) = \beta \sigma^2(n-1) + \alpha \sigma^2(n) + \beta \sigma^2(n)$, wherein $\alpha$ and $\beta$ represent weighted smoothing factors, and $\beta + \alpha + \beta = 1$ is satisfied, for example, $\beta = 0.25$ and $\alpha = 0.5$ can be taken.

Then, an equivalent downlink channel value is calculated based on the SRS channel values and the beamforming vectors; and the subband/broadband SINR value is recalculated according to the equivalent downlink channel value and the recalculated JT interference noise and based on a certain receiver hypothesis.

The equivalent downlink channel value is calculated by using the following formula:

$$H_{eff} \triangleq \omega_s (H_s^{UL})^T W_s + \omega_c (H_c^{UL})^T W_c \quad (6);$$

in order to keep the uplink channel power and the downlink channel power identical in the simulation, $\omega_s = \omega_c = 0.5$ is taken.

In the scenario that a single cell has precoding CQI recalculation, there is no coordinated cell item, and $H_{eff} \triangleq \omega_s (H_s^{UL})^T W_s$ is taken.

The SINR value can be recalculated by using the following formula based on a Minimum Mean Square Error (MMSE) hypothesis:

$$SINR_k = \frac{1}{M_{k,k}} - 1; \quad (7)$$

in the above formula (7), $M = \sigma^2 (H_{eff}^H H_{eff} + \sigma^2 I)^{-1}$, and k represents a layer number.

Then, according to the recalculated equivalent subband/broadband SINR value, the SINR-CQI mapping table is looked up, and the recalculated subband/broadband CQI value is obtained.

In step S104, modulation and coding is selected according to the recalculated subband/broadband CQI value to schedule data transmission.

The serving cell and coordinated cell select appropriate modulation and coding schemes according to the recalculated subband/broadband CQI value, and perform JT scheduled transmission.

The serving cell and coordinated cell also can perform certain backspacing on the recalculated subband/broadband CQI value, and perform scheduling with a more conservative modulation and coding scheme.

In the embodiment, through the above scheme, with respect to the CoMP JT scenario, by performing JT CQI recalculation on the per-cell CQI based on the SFBC hypothesis and/or performing CQI recalculation in a case that the single cell has precoding, the accuracy of the CQI used by the BS for scheduling is improved, and the oscillation during the AMC process is reduced.

Particularly, the method of the embodiment is also applicable to per-cell CQI recalculation, and in this scenario, the BS side recalculates the CQI in the case that there is precoding by using the CQI based on the SFBC hypothesis reported by the UE, and then performs scheduled transmission.

Figure 3:
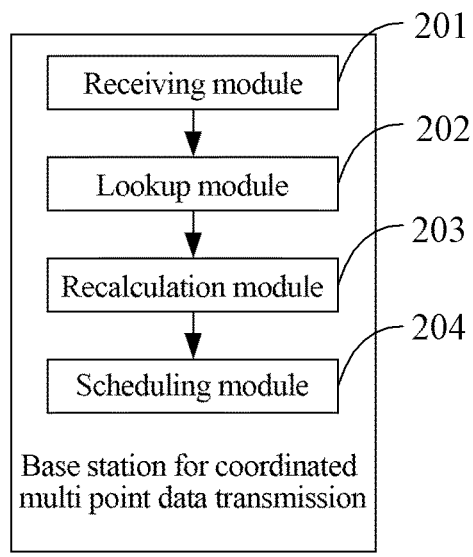
FIG. 3 is a schematic diagram of a structure of a base station for coordinated multi point data transmission in the embodiment of the present document.

As shown in FIG. 3, a base station for coordinated multi point data transmission provided in one embodiment of the present document comprises: a receiving module 201, a lookup module 202, a recalculation module 203 and a scheduling module 204, wherein:

the receiving module 201 is configured to: receive a per-cell CQI value reported by a UE;

the lookup module 202 is configured to: look up an SINR-CQI mapping table according to the per-cell CQI value and acquire a subband/broadband SINR value;

the recalculation module 203 is configured to: performing CQI recalculation according to the subband/broadband SINR value, and acquire a recalculated subband/broadband CQI value; and the scheduling module 204 is configured to: select modulation and coding according to the recalculated subband/broadband CQI value to schedule data transmission.

Firstly, the UE performs downlink channel estimation by using a CRS, and performs SINR calculation.

In the Rel-8/Rel-9 LTE system, the UE assumes that only the serving cell uses an SFBC mode to perform transmission, and performs downlink channel estimation according to the CRS, and it can perform SINR calculation by using a downlink CRS channel estimation result. For example, the SINR calculation can be calculated according to the following formula (1):

$$SINR_s = \frac{0.5 * |H_s^{DL}|^2}{P_{ICI}^c + P_{ICI}^{out} + P_N} \quad (1)$$

wherein, $H_s^{DL}$ indicates a downlink channel obtained by estimation through the CRS, $P_{ICI}^c$ indicates interference power of cells within the coordinated set, $P_{ICI}^{out}$ indicates interference power of other cells except the serving cell and coordinated cell, and $P_N$ indicates noise power.

As can be seen from the above formula (1) that, the interference noise estimated by the UE side through the CRS simultaneously contains three items: $P_{ICI}^c$, $P_{ICI}^{out}$ and $P_N$. In fact, with regard to the JT UE, the first item is actually a useful signal, only the second item and the third item are actual interference and noise, a sum of out-set interference noise power is indicated by $\sigma^2 \stackrel{\text{def}}{=} P_{ICI}^{out} + P_N$, and the recalculation of the out-set interference noise power will be performed at the BS side in the following steps.

The UE uses the calculated SINR value to look up an SINR-CQI mapping table and obtains a per-cell CQI value, and feeds back the per-cell CQI value to the serving cell.

Different SINR values reflect different channel conditions, if an SINR value is lower, it indicates that a channel condition is worse, and a modulation and coding level that can be scheduled by the base station is lower; and if the SINR value is higher, it indicates that the channel condition is better, and the modulation and coding level that can be scheduled by the base station is higher.

Wherein, the SINR-CQI mapping table is to divide an SINR value range from low to high into 16 areas to be respectively mapped to CQI values 0~15 according to results of repeated performance simulations and certain empirical laws, as shown in the following Table 1.

The CQI feedback can be subband feedback or broadband feedback, the subband feedback refers to feeding back a CQI value on each scheduled subband, and the broadband feedback refers to feeding back a CQI value on the whole bandwidth.

The base station reversely looks up the SINR-CQI mapping table through the subband and/or broadband CQI value reported by the UE and obtains the subband/broadband SINR value.

After the serving cell receives the CQI value reported by the UE through the receiving module 201, the lookup module 202 reversely looks up the SINR-CQI mapping table through the CQI value to obtain the SINR value, the lookup method can be: taking a lower bound or upper bound of an SINR area corresponding to the CQI or a mean value of two adjacent thresholds.

For example, $SINR_{cur}$ an SINR value corresponding to the CQI and $SINR_{next}$ is an SINR value corresponding to the CQI+1, thus a reversely lookup SINR can be the $SINR_{cur}$, $SINR_{next}$ or $0.5 \times (SINR_{cur} + SINR_{next})$.

Then, the recalculation module 203 performs CQI recalculation according to the subband/broadband SINR value, and acquires a recalculated subband/broadband CQI value.

Firstly, the serving cell and the coordinated cell respectively perform uplink channel estimation through the SRS, and calculate beamforming vectors according to this.

The serving cell and the coordinated cell respectively perform uplink channel estimation by using the received SRS value, obtain a serving cell uplink channel $H_s^{UL}$ and a coordinated cell uplink channel $H_c^{UL}$, and perform beamforming vector calculation by using channel estimation results, and a calculation method thereof can be the following two kinds:

(1) EBB algorithm;
(2) SVD algorithm.

The beamforming vectors of the serving cell and coordinated cell are respectively recorded as $W_s$ and $W_c$.

Moreover, in order to improve the accuracy of the following calculation, the serving cell and coordinated cell also can perform subband/broadband averaging on the SRS channel values and the beamforming vectors.

Then, the JT interference noise is recalculated according to the SRS channel values of the serving cell and coordinated cell and the SINR value.

For example, the JT interference noise can be recalculated according to the following method according to the above formula (1):

$$\sigma^2 \stackrel{\text{def}}{=} P_{ICI}^{out} + P_N = \frac{0.5 * |H_s^{DL}|^2}{SINR_s} - P_{ICI}^c; \quad (2)$$

Since uplink and downlink channels of a TDD system have reciprocity, the BS can take an uplink channel obtained by estimation through the SRS as a similarity to a downlink channel.

By taking two coordinated cells as an example, the base station uses 4-transmitting-antennas (2-transmitting-ports) configuration, and the UE uses 2-receiving-antennas configuration. At the UE side, downlink channels $H_s^{DL}$ and $H_c^{DL}$ are obtained by estimation according to the CRS, and a dimensionality is 2×2. At the base station side, uplink channels $H_s^{UL}$ and $H_c^{UL}$ are obtained by estimation according to the SRS, and a dimensionality is 4×2.

At the transmitting terminal, data of two ports of the CRS are mapped via the antennas and multiplied by a broadcasting weight to be transmitted. The first transmitting port mapping to the first antenna and the second antenna, the second transmitting port mapping to the third antenna and the fourth antenna, and power of all antennas being equally divided are taken as an example. It can be represented by a matrix $$W_{BC} = \begin{bmatrix} 0.5 \\ 0.5 \\ & 0.5 \\ & 0.5 \end{bmatrix}.$$

Obviously, according to the channel reciprocity, $H_s^{DL} \leftrightarrow (H_s^{UL})^{T*}W_{BC}$, $H_c^{DL} \leftrightarrow (H_c^{UL})^{T*}W_{BC}$, wherein, $\leftrightarrow$ represents being equivalent to.

In addition, without loss of generality, it is assumed that a scheme similar to CRS shift is adopted in the JT coordinated cell, that is, CRSs of the serving cell and coordinated cell are transmitted on the same RE. Therefore, coordinated cell interference measured on the CRS of the serving cell is from the CRS of the coordinated cell. Since transmitting ports of the CRS of the coordinated cell are mutually staggered, the number of transmitting ports is recorded as $N_{TxPort}$, and power on each port is $1/N_{TxPort}$ of total transmitted power of the CRS. A sum of transmitted power of all ports of the CRS is 1. At the base station side, a two-antennas alternating transmission scheme is used for the SRS, transmitted power of each antenna is 1, thus SRS channel power is two times of CRS channel power.

The basic steps of the interference noise recalculation in the embodiment include: firstly restoring signal power and coordinated cell signal power mistakenly taken as "interference", subtracting the coordinated cell signal power from the interference noise power restored by using the per-cell CQI, and obtaining the JT interference noise power.

For example, the interference noise recalculation can be performed according to the following steps.

In step 1, the signal power is restored:

$$\text{SigPwr}=0.5*|(H_s^{UL})^{T*}W_{BC}|^2 \qquad (3).$$

In step 2, the coordinated cell interference is restored:

$$P_{ICI}^c = |(H_c^{UL})^{T*}W_{BC}|^2 (2*N_{TxPort}) \qquad (4).$$

With regard to a scenario of multiple coordinated cells, it is only required to add signal energy of the multiple coordinated cells, that is, $P_{ICI}^c = P_{ICI_1}^c + P_{ICI_2}^c + \ldots + P_{ICI_N}^c;$ and with regard to a scenario that a single cell has precoding CQI recalculation, $P_{ICI}^c = 0$.

In step 3, the JT interference noise power is recalculated:

$$\sigma^2 = \frac{\text{SigPwr}}{\text{SINR}} - P_{ICI}^c. \qquad (5)$$

When subband CQI calculation is performed, interference noise recalculation is independently performed on each subband, certain smoothing can be performed between subbands, for example, calculation is performed according to $\sigma^2(n)=\beta\sigma^2(n-1)+\alpha\sigma^2(n)+\beta\sigma^2(n)$, wherein $\alpha$ and $\beta$ represent weighted smoothing factors, and $\beta+\alpha+\beta=1$ is satisfied, for example, $\beta=0.25$ and $\alpha=0.5$ can be taken.

Then, an equivalent downlink channel value is calculated based on the SRS channel values and the beamforming vectors; and the subband/broadband SINR value is recalculated according to the equivalent downlink channel value and the recalculated JT interference noise and based on a certain receiver hypothesis.

The equivalent downlink channel value is calculated by using the following formula:

$$H_{\text{eff}} \triangleq \omega_s (H_s^{UL})^T W_s + \omega_c (H_c^{UL})^T W_c \qquad (6);$$

In order to keep the uplink channel power and the downlink channel power identical in the simulation, $\omega_s = \omega_c = 0.5$ is taken.

In the scenario that a single cell has precoding CQI recalculation, there is no coordinated cell item, and $H_{\text{eff}} \triangleq \omega_s (H_s^{UL})^T W_s$ is taken.

The SINR value can be recalculated by using the following formula based on an MMSE hypothesis:

$$\text{SINR}_k = \frac{1}{M_{k,k}} - 1; \qquad (7)$$

In the above formula (7), $M = \sigma^2 (H_{\text{eff}}^H H_{\text{eff}} + \sigma^2 I)^{-1}$, and k represents a layer number.

Then, according to the recalculated equivalent subband/broadband SINR value, the SINR-CQI mapping table is looked up, and the recalculated subband/broadband CQI value is obtained.

The scheduling modules 204 of the serving cell and coordinated cell select appropriate modulation and coding schemes according to the recalculated subband/broadband CQI value, and perform JT scheduled transmission.

The serving cell and coordinated cell also can perform certain backspacing on the recalculated subband/broadband CQI value, and perform scheduling with a more conservative modulation and coding scheme.

Figure 4:
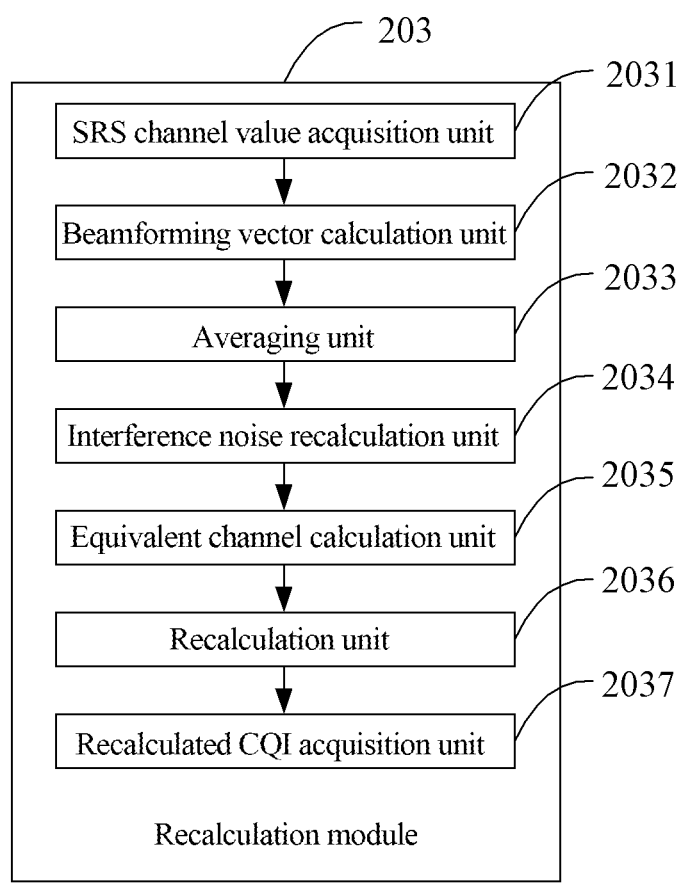
FIG. 4 is a schematic diagram of a structure of a recalculation module in the base station for coordinated multi point data transmission in the embodiment of the present document.

In the implementation process, as shown in FIG. 4, the recalculation module 203 includes: an SRS channel value acquisition unit 2031, a beamforming vector calculation unit 2032, an averaging unit 2033, an interference noise recalculation unit 2034, an equivalent channel calculation unit 2035, a recalculation unit 2036 and a recalculated CQI acquisition unit 2037, wherein:

the SRS channel value acquisition unit 2031 is configured to: perform uplink channel estimation through an SRS, and acquire SRS channel values of a serving cell and a coordinated cell;

the beamforming vector calculation unit 2032 is configured to: calculate beamforming vectors of the serving cell and the coordinated cell through the SRS channel values;

the averaging unit 2033 is configured to: perform subband/broadband averaging on the SRS channel values and the beamforming vectors;

the interference noise recalculation unit 2034 is configured to: recalculate a JT interference noise according to the SRS channel values and the subband/broadband SINR value;

the equivalent channel calculation unit 2035 is configured to: calculate an equivalent downlink channel value based on the SRS channel values and the beamforming vectors;

the recalculation unit 2036 is configured to: recalculate the subband/broadband SINR value according to the equivalent downlink channel value and the recalculated JT interference noise; and the recalculated CQI acquisition unit 2037 is configured to: look up the SINR-CQI mapping table according to the recalculated subband/broadband SINR value, and acquire the recalculated subband/broadband CQI value.

In the embodiment, through the above scheme, with respect to the CoMP JT scenario, by performing JT CQI recalculation on the per-cell CQI based on the SFBC hypothesis and/or performing CQI recalculation in a case that the single cell has precoding, the accuracy of the CQI used by the BS for scheduling is improved, and the oscillation during the AMC process is reduced.

Particularly, the embodiment is also applicable to per-cell CQI recalculation, and in this scenario, the BS side recalculates the CQI in the case that there is precoding by using the CQI based on the SFBC hypothesis reported by the UE, and then performs scheduled transmission.

With the method and base station for coordinated multi point data transmission of the embodiments of the present document, in the CoMP system, and in a joint transmission scenario, the BS performs JT CQI recalculation according to the per-cell CQI value fed back by the UE, and acquires the recalculated subband/broadband CQI value; and selects modulation and coding according to the recalculated subband/broadband CQI value to schedule data transmission, thereby improving the accuracy of the CQI value used by the BS for scheduling, and reducing the oscillation during the AMC process.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The embodiment of the present document is not limited to any combination of hardware and software in a specific form.

The above description is only the preferred embodiments of the present document, which does not limit the patent scope of the present document due to this. Equivalent structures or flow transformations made by using the contents of the descriptions and accompanying drawings of the present document, or equivalent structures or flow transformations directly or indirectly applied in other related technical fields, are all included in the patent protection scope of the present document similarly.

INDUSTRIAL APPLICABILITY

With the method and base station for coordinated multi point data transmission provided in the embodiments of the present document, in the CoMP system, and in a joint transmission scenario, the BS performs JT CQI recalculation according to the per-cell CQI value fed back by the UE, and acquires the recalculated subband/broadband CQI value; and selects modulation and coding according to the recalculated subband/broadband CQI value to schedule data transmission, thereby improving the accuracy of the CQI value used by the BS for scheduling, and reducing the oscillation during the AMC process.

What is claimed is:

1. A method for coordinated multi point data transmission, comprising:
   a base station receiving a per-cell channel quality indicator (CQI) value reported by a user equipment (UE);
   looking up a signal to interference plus noise ratio (SINR)-CQI mapping table according to the per-cell CQI value, and acquiring a subband/broadband SINR value;
   performing CQI recalculation according to the subband/broadband SINR value, and acquiring a recalculated subband/broadband CQI value; and
   selecting modulation and coding according to the recalculated subband/broadband CQI value to schedule data transmission;
   wherein, the step of the base station performing CQI recalculation according to the subband/broadband SINR value, and acquiring a recalculated subband/broadband CQI value comprises:
   the base station performing uplink channel estimation through a sounding reference signal (SRS), acquiring SRS channel values of a serving cell and a coordinated cell; and calculating beamforming vectors of the serving cell and the coordinated cell through the SRS channel values;
   recalculating a joint transmission (JT) interference noise according to the SRS channel values and the subband/broadband SINR value;
   calculating an equivalent downlink channel value based on the SRS channel values and the beamforming vectors;
   recalculating the subband/broadband SINR value according to the equivalent downlink channel value and the recalculated JT interference noise; and
   looking up the SINR-CQI mapping table according to the recalculated subband/broadband SINR value, and acquiring the recalculated subband/broadband CQI value.

2. The method according to claim 1, wherein, a way for calculating the beamforming vectors at least comprises: an Eigen-based beamforming (EBB) algorithm or a singular-value decomposition (SVD) algorithm.

3. The method according to claim 2, wherein, the step of the base station recalculating a JT interference noise according to the SRS channel values and the subband/broadband SINR value comprises:
   the base station restoring base station transmitting port signal power and a coordinated cell interference signal according to the SRS channel values; and recalculating the JT interference noise according to the restored base station transmitting port signal power and coordinated cell interference signal and the subband/broadband SINR value.

4. The method according to claim 1, wherein, after the step of the base station acquiring SRS channel values of a serving cell and a coordinated cell; and calculating beamforming vectors of the serving cell and the coordinated cell through the SRS channel values, the method further comprises:
   the base station performing subband/broadband averaging on the SRS channel values and the beamforming vectors.

5. The method according to claim 4, wherein, the step of the base station recalculating a JT interference noise according to the SRS channel values and the subband/broadband SINR value comprises:
   the base station restoring base station transmitting port signal power and a coordinated cell interference signal according to the SRS channel values; and recalculating the JT interference noise according to the restored base station transmitting port signal power and coordinated cell interference signal and the subband/broadband SINR value.

6. The method according to claim 1, wherein, the step of the base station recalculating a JT interference noise according to the SRS channel values and the subband/broadband SINR value comprises:

the base station restoring base station transmitting port signal power and a coordinated cell interference signal according to the SRS channel values; and recalculating the JT interference noise according to the restored base station transmitting port signal power and coordinated cell interference signal and the subband/broadband SINR value.

7. A base station for coordinated multi point data transmission, comprising:

a receiving circuitry, configured to: receive a per-cell channel quality indicator (CQI) value reported by a user equipment (UE);

a lookup circuitry, configured to: look up a signal to interference plus noise ratio (SINR)-CQI mapping table according to the per-cell CQI value and acquire a subband/broadband SINR value;

a recalculation circuitry, configured to: perform CQI recalculation according to the subband/broadband SINR value, and acquire a recalculated subband/broadband CQI value; and a scheduling circuitry, configured to: select modulation and coding according to the recalculated subband/broadband CQI value to schedule data transmission;

wherein, the recalculation circuitry comprises:

an SRS channel value acquisition circuitry, configured to: perform uplink channel estimation through a sounding reference signal (SRS), and acquire SRS channel values of a serving cell and a coordinated cell;

a beamforming vector calculation circuitry, configured to: calculate beamforming vectors of the serving cell and the coordinated cell through the SRS channel values;

an interference noise recalculation circuitry, configured to: recalculate a joint transmission (JT) interference noise according to the SRS channel values and the subband/broadband SINR value;

an equivalent channel calculation circuitry, configured to: calculate an equivalent downlink channel value based on the SRS channel values and the beamforming vectors;

a recalculation circuitry, configured to: recalculate the subband/broadband SINR value according to the equivalent downlink channel value and the recalculated JT interference noise; and a recalculated CQI acquisition circuitry, configured to: look up the SINR-CQI mapping table according to the recalculated subband/broadband SINR value, and acquire the recalculated subband/broadband CQI value.

8. The base station according to claim 7, wherein, a way for calculating the beamforming vectors at least comprises: an Eigen-based beamforming (EBB) algorithm or a singular-value decomposition (SVD) algorithm.

9. The base station according to claim 7, wherein, the recalculation circuitry further comprises:

an averaging circuitry, configured to: perform subband/broadband averaging on the SRS channel values and the beamforming vectors.

10. The base station according to claim 7, wherein, the interference noise recalculation circuitry is configured to: restore base station transmitting port signal power and a coordinated cell interference signal according to the SRS channel values; and recalculate the JT interference noise according to the restored base station transmitting port signal power and coordinated cell interference signal and the subband/broadband SINR value.

* * * * *